United States Patent
Planque et al.

(10) Patent No.: US 10,494,729 B2
(45) Date of Patent: Dec. 3, 2019

(54) ELEMENTARY UNIT FOR REACTOR PERFORMING WATER ELECTROLYSIS OR CO-ELECTROLYSIS (SOEC) OR FUEL CELL (SOFC) OPERATING UNDER PRESSURE

(71) Applicant: COMMISSARIAT A L'ENERGIE ATOMIQUE ET AUX ENERGIES ALTERNATIVES, Paris (FR)

(72) Inventors: Michel Planque, Seyssins (FR); Magali Reytier, Villard de Lans (FR); Guilhem Roux, Saint-Egreve (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 256 days.

(21) Appl. No.: 15/536,383

(22) PCT Filed: Dec. 14, 2015

(86) PCT No.: PCT/EP2015/079636
§ 371 (c)(1),
(2) Date: Jun. 15, 2017

(87) PCT Pub. No.: WO2016/096752
PCT Pub. Date: Jun. 23, 2016

(65) Prior Publication Data
US 2017/0362724 A1    Dec. 21, 2017

(30) Foreign Application Priority Data
Dec. 18, 2014   (FR) ...................................... 14 62699

(51) Int. Cl.
*H01M 8/00*    (2016.01)
*H01M 8/021*   (2016.01)
(Continued)

(52) U.S. Cl.
CPC ............... *C25B 15/08* (2013.01); *C25B 1/12* (2013.01); *C25B 9/06* (2013.01); *C25B 9/20* (2013.01);
(Continued)

(58) Field of Classification Search
None
See application file for complete search history.

(56) References Cited

U.S. PATENT DOCUMENTS

| | | |
|---|---|---|
| 6,689,499 B2 | 2/2004 | Gillett et al. |
| 2002/0081471 A1 | 6/2002 | Keegan et al. |

(Continued)

FOREIGN PATENT DOCUMENTS

| | | | |
|---|---|---|---|
| FR | 2957361 A1 | 9/2011 | |
| FR | 3000108 A1 | 6/2014 | |
| FR | 3000108 A1 * | 6/2014 | .......... H01M 8/2425 |

OTHER PUBLICATIONS

Corresponding PCT application No. PCT/EP2015/079636, International Search Report dated Feb. 16, 2016.

*Primary Examiner* — Maria Laios
(74) *Attorney, Agent, or Firm* — Cooper Legal Group, LLC; Ronald M. Kachmarik

(57) ABSTRACT

A module for an HTE reactor or an SOFC fuel cell, the module including a circuit for the circulation of a gas, in addition to the reactive gases required for the electrolysis reaction or the reverse reaction in an SOFC cell, the circuit enabling, during the operation under pressure, the additional gas to equalise, on one side of the glass- and/or vitroceramic-based seals, the pressure of the reactive gases generated on the other side.

22 Claims, 9 Drawing Sheets

Figure 1:
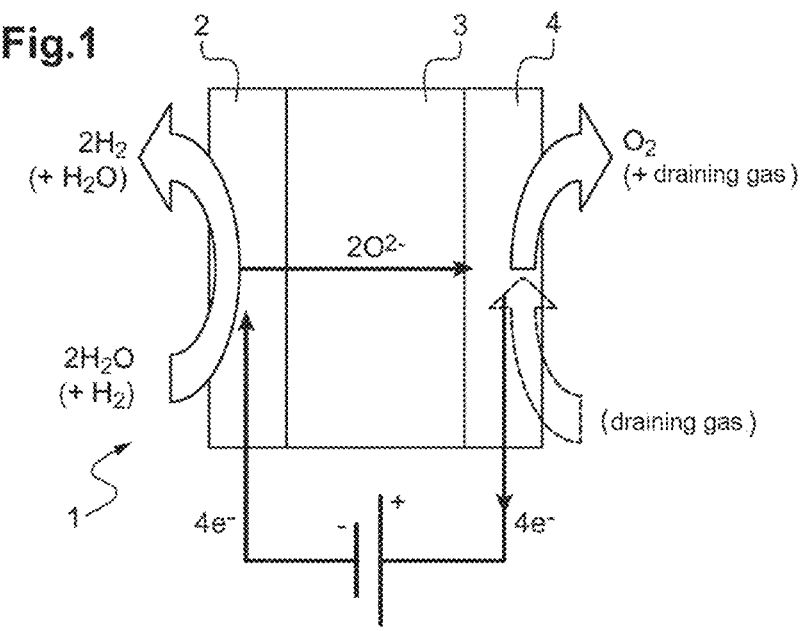

(51) Int. Cl.
*H01M 8/0247* (2016.01)
*H01M 8/0282* (2016.01)
*H01M 8/0276* (2016.01)
*H01M 8/2432* (2016.01)
*H01M 8/0258* (2016.01)
*H01M 8/2425* (2016.01)
*H01M 8/124* (2016.01)
*H01M 8/04664* (2016.01)
*H01M 8/04746* (2016.01)
*C25B 15/08* (2006.01)
*C25B 1/12* (2006.01)
*C25B 9/20* (2006.01)
*C25B 9/06* (2006.01)

(52) U.S. Cl.
CPC ........... *H01M 8/006* (2013.01); *H01M 8/021* (2013.01); *H01M 8/0247* (2013.01); *H01M 8/0258* (2013.01); *H01M 8/0276* (2013.01); *H01M 8/0282* (2013.01); *H01M 8/2425* (2013.01); *H01M 8/2432* (2016.02); *H01M 8/04671* (2013.01); *H01M 8/04753* (2013.01); *H01M 2008/1293* (2013.01); *Y02E 60/366* (2013.01); *Y02P 20/132* (2015.11)

(56) References Cited

U.S. PATENT DOCUMENTS

2003/0054210 A1   3/2003   Gillett et al.
2012/0325654 A1   12/2012  Le Gallo et al.
2015/0333342 A1*  11/2015  Planque .............. H01M 8/2425
                                                         429/457

\* cited by examiner (STATE OF THE ART)

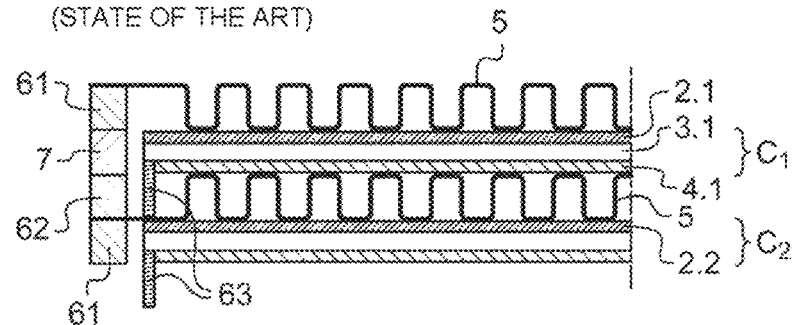
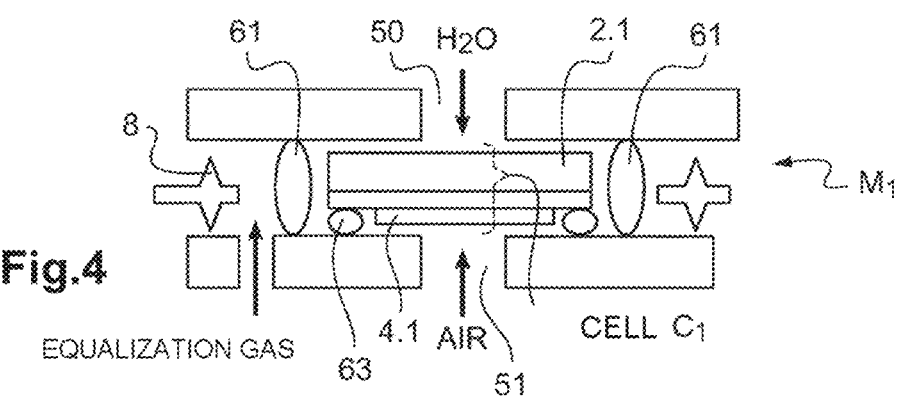
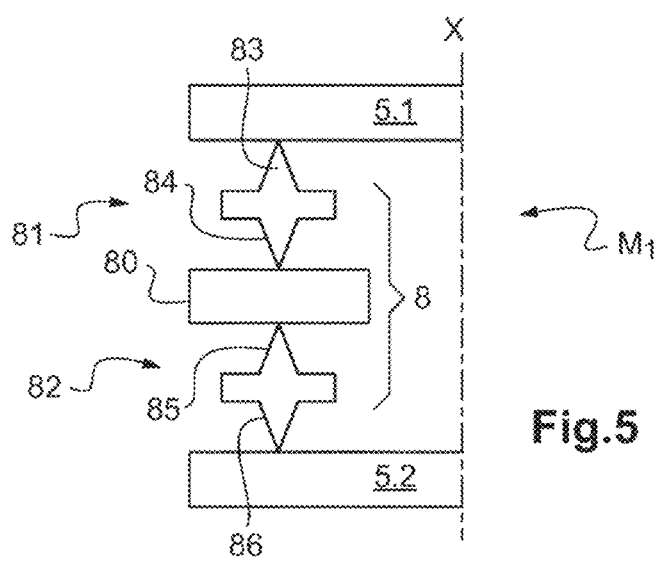

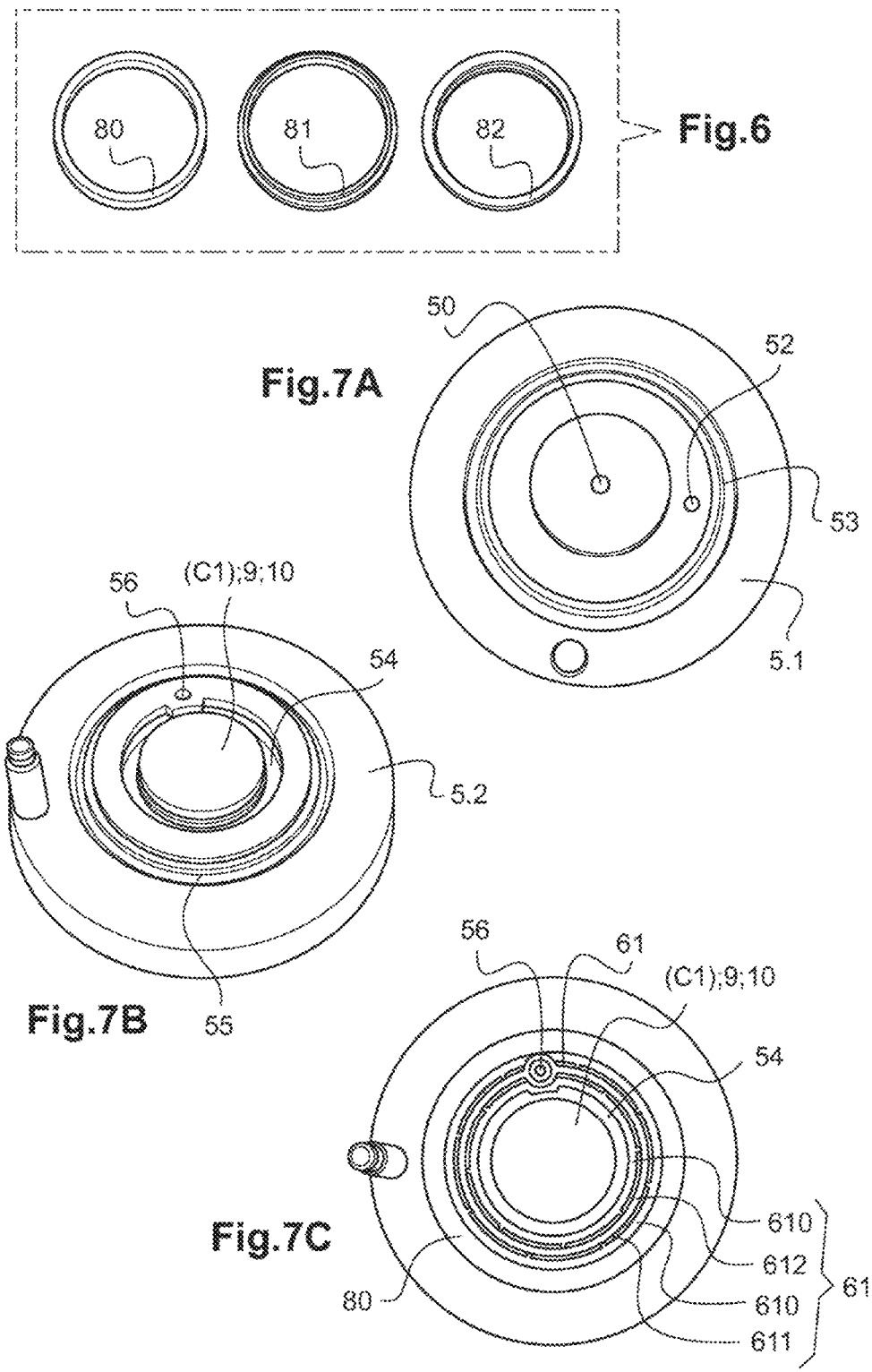

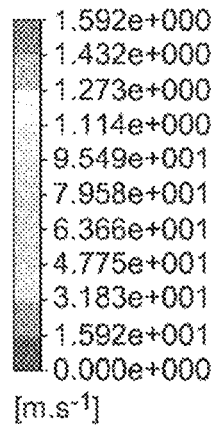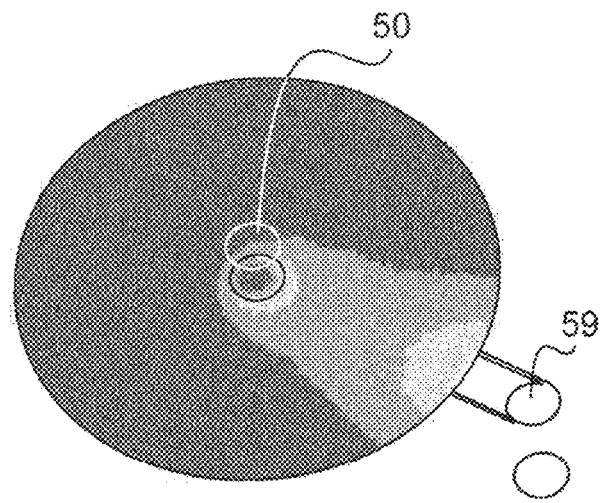
Fig.8A
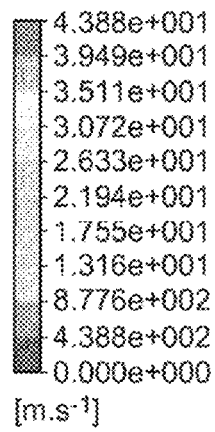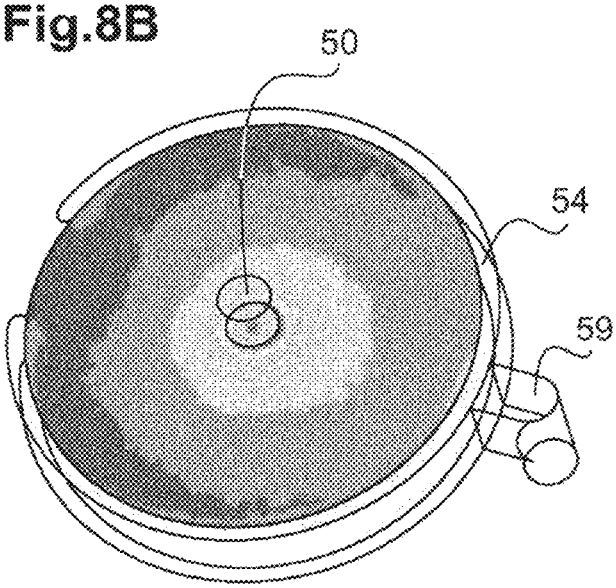
Fig.8B

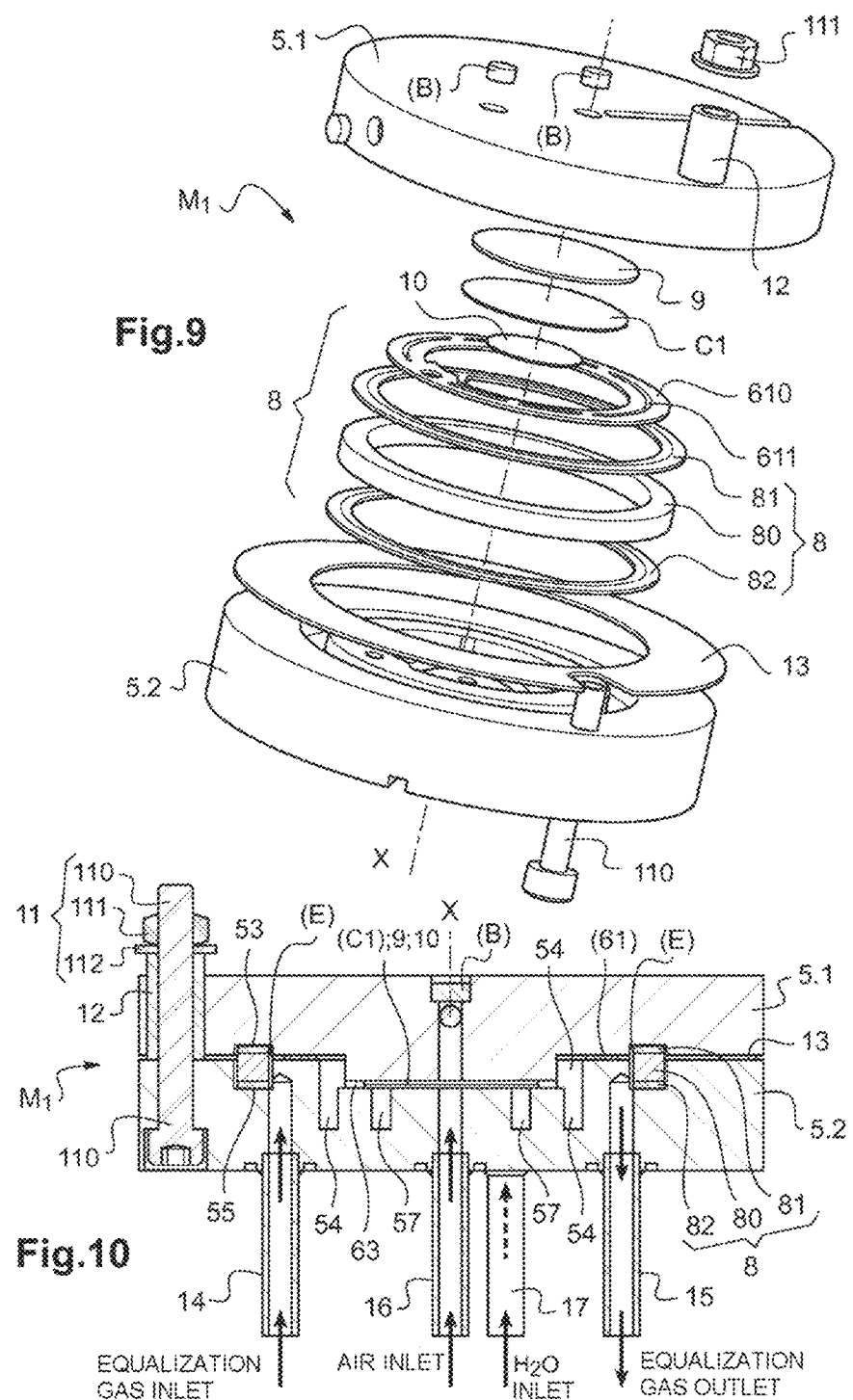

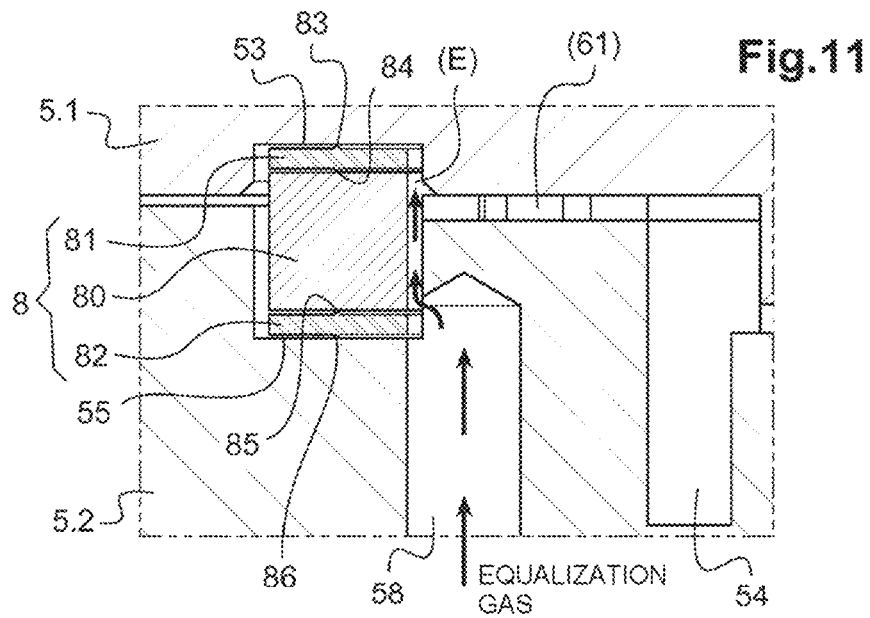
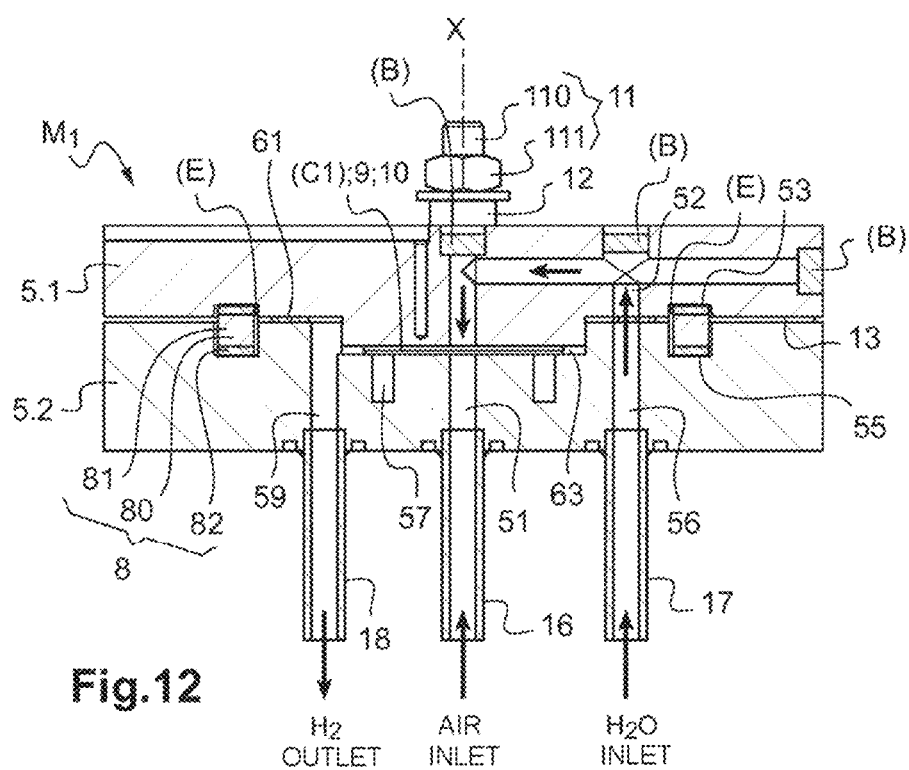

ELEMENTARY UNIT FOR REACTOR PERFORMING WATER ELECTROLYSIS OR CO-ELECTROLYSIS (SOEC) OR FUEL CELL (SOFC) OPERATING UNDER PRESSURE

TECHNICAL FIELD

The present invention relates to the field of solid oxide fuel cells (SOFCs), to the field of high-temperature electrolysis (HTE) of water, or high-temperature steam electrolysis (HTSE), also with solid oxides (SOEC, acronym for "Solid Oxide Electrolyzer Cell"), and to the field of high-temperature co-electrolysis of water and of another gas selected from carbon dioxide $CO_2$ or nitrogen dioxide $NO_2$.

The invention relates more particularly to the design of a novel module integrating electrical and fluidic interconnectors for distributing the electric current and gases within a reactor for the high-temperature electrolysis or co-electrolysis of water (HTE) of the SOEC type for producing hydrogen $H_2$ from steam $H_2O$, or of a fuel cell of the SOFC type, and a unit electrochemical cell.

The module according to the invention makes operation under pressure possible.

Although described mainly with reference to the application of high-temperature electrolysis of water, the invention applies both to co-electrolysis of water and another gas selected from carbon dioxide $CO_2$ or nitrogen dioxide $NO_2$, and to an SOFC fuel cell.

The invention applies to an SOFC fuel cell using either hydrogen, or a hydrocarbon, for example methane $CH_4$, as fuel.

PRIOR ART

The electrolysis of water is an electrolytic reaction that decomposes water into gaseous dioxygen and dihydrogen by means of an electric current according to the reaction: $H_2O \rightarrow H_2 + 1/2 O_2$.

It is advantageous to carry out the electrolysis of water at high temperature, typically between 600 and 950° C., as some of the energy required for the reaction can be supplied by heat, which is less expensive than electricity, and activation of the reaction is more efficient at high temperature and does not require a catalyst. For implementing electrolysis at high temperature, use of an electrolyzer of the SOEC type (acronym for "solid oxide electrolyzer cell") is known, consisting of a stack of elementary units, each comprising a solid oxide electrolysis cell, consisting of three layers anode/electrolyte/cathode superposed on one another, and of interconnection plates made of metal alloys, also called bipolar plates, or interconnectors. The function of the interconnectors is to provide both passage of the electric current and circulation of the gases in the vicinity of each cell (injected steam, hydrogen and oxygen extracted in an HTE electrolyzer; air and hydrogen injected and water extracted in an SOFC cell) and to separate the anode and cathode compartments, which are the compartments for circulation of the gases on the anode side and the cathode side of the cells, respectively. For carrying out high-temperature electrolysis of steam HTE, steam $H_2O$ is injected into the cathode compartment. Under the action of the current applied to the cell, dissociation of the water molecules in the form of steam takes place at the interface between the hydrogen electrode (cathode) and the electrolyte: this dissociation produces dihydrogen gas $H_2$ and oxygen ions. The dihydrogen is collected and evacuated at the outlet of the hydrogen compartment. The oxygen $O^{2-}$ ions migrate through the electrolyte and recombine into dioxygen at the interface between the electrolyte and the oxygen electrode (anode).

As shown schematically in FIG. 1, each unit electrolysis cell 1 is formed from a cathode 2 and an anode 4, placed on either side of a solid electrolyte 3, generally in the form of a membrane. The two electrodes (cathode and anode) 2,4 are electrical conductors, made of porous material, and the electrolyte 3 is impervious to gas, and is an electronic insulator and an ionic conductor. The electrolyte may in particular be an anionic conductor, more precisely an anionic conductor of $O^{2-}$ ions and the electrolyzer is then called an anionic electrolyzer.

The electrochemical reactions take place at the interface between each of the electronic conductors and the ionic conductor.

At the cathode 2, the half-reaction is:

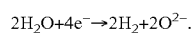

At the anode 4, the half-reaction is:

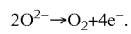

The electrolyte 3 inserted between the two electrodes 2, 4 is the site of migration of the $O^{2-}$ ions under the effect of the electric field created by the potential difference imposed between the anode 4 and the cathode 2.

As shown in parentheses in FIG. 1, the steam at cathode inlet may be accompanied by hydrogen $H_2$ and the hydrogen produced and recovered at the outlet may be accompanied by steam. Moreover, as illustrated with dotted lines, a draining gas such as air may additionally be injected at the inlet for evacuating the oxygen produced. Injection of a draining gas has the additional function of performing the role of thermal regulator.

A unit electrolysis reactor consists of a elementary unit as described above, with a cathode 2, an electrolyte 3, and an anode 4, and of two single-pole connectors, which provide the functions of electrical, hydraulic and thermal distribution.

Stacking of several unit electrolysis cells on top of one another, separating them with interconnection devices, usually called interconnectors or bipolar interconnection plates, is known for increasing the flow rates of hydrogen and oxygen produced. The assembly is positioned between two interconnection end plates, which support the electrical feeds and supplies of gases to the electrolyzer (electrolysis reactor).

A high-temperature electrolyzer (HTE) for water thus comprises at least one, generally a plurality of electrolysis cells stacked on top of one another, each elementary unit being formed from an electrolyte, a cathode and an anode, the electrolyte being inserted between the anode and the cathode.

The fluidic and electrical interconnection devices that are in electrical contact with one or more electrodes generally provide the functions of supply and collection of electric current and delimit one or more gas circulation compartments.

Thus, a so-called cathode compartment has the function of distributing the electric current and steam as well as recovering the hydrogen at the cathode in contact.

A so-called anode compartment has the function of distributing the electric current as well as recovering the oxygen produced at the anode in contact, optionally by means of a draining gas.

Figure 2:
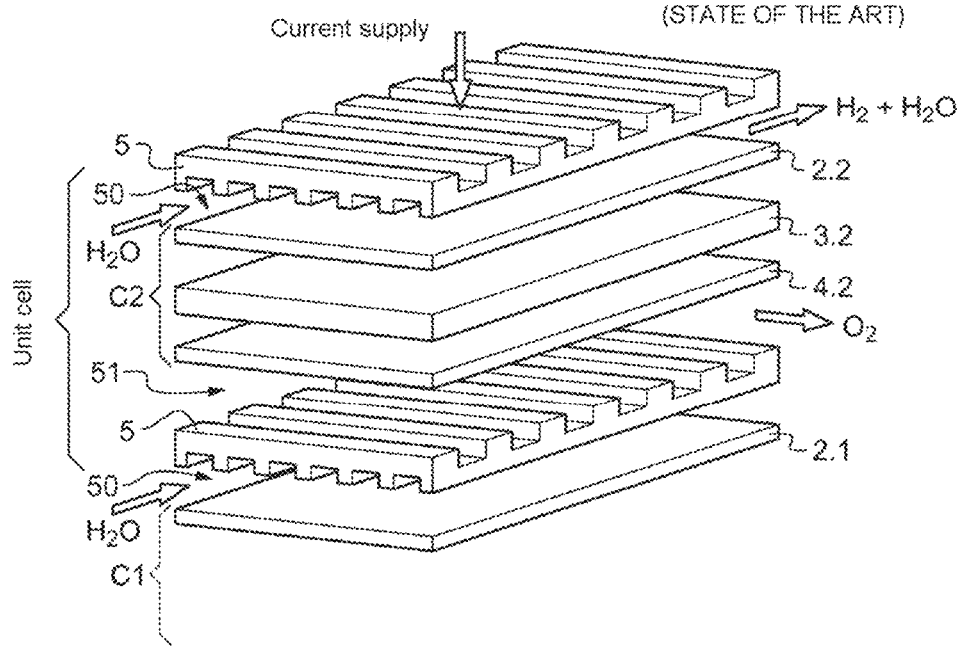

FIG. 2 shows an exploded view of elementary units of a high-temperature steam electrolyzer according to the state of the art. This HTE electrolyzer comprises a plurality of unit electrolysis cells C1, C2 . . . of the solid-oxide type (SOEC) stacked alternately with interconnectors 5. Each cell C1, C2 . . . consists of a cathode 2.1, 2.2, . . . and an anode 4.1, 4.2, with an electrolyte 3.1, 3.2 . . . arranged between them. The assembly of electrolysis cells is supplied with electric current in series and with the gases in parallel.

The interconnector 5 is a component made of metal alloy, which provides the separation between the cathode compartment 50 and anode compartment 51, defined by the spaces between the interconnector 5 and the adjacent cathode 2.1 and between the interconnector 5 and the adjacent anode 4.2 respectively. It also provides distribution of the gases to the cells. Injection of steam into each elementary unit takes place in the cathode compartment 50. Collecting of the hydrogen produced and of the residual steam at the cathode 2.1, 2.2 . . . takes place in the cathode compartment 50 downstream of the cell C1, C2 . . . after dissociation of the steam by the latter. Collecting of the oxygen produced at the anode 4.2 takes place in the anode compartment 51 downstream of the cell C1, C2 . . . after dissociation of the steam into oxygen ions by the latter.

The interconnector 5 provides passage of the current between the cells C1 and C2 by direct contact with the adjacent electrodes, i.e. between the anode 4.2 and the cathode 2.1.

In a solid oxide fuel cell SOFC according to the state of the art, the cells C1, C2 . . . and interconnectors 5 used are the same components, but operation is the reverse of that of an HTE electrolyzer as has just been explained with the direction of the current reversed, with air which supplies the cathode compartments and hydrogen as fuel, which supplies the anode compartments.

Satisfactory operation of an HTE electrolyzer requires the following essential functions, among others:

A/ good electrical insulation between two adjacent interconnectors in the stack, to avoid short-circuiting the unit electrolysis cell inserted between the two interconnectors;

B/ good hermeticity between the two separate compartments, i.e. anode and cathode compartments, to avoid recombination of the gases produced, leading to a decrease in efficiency and especially the appearance of hot spots that damage the electrolyzer; this corresponds to detecting an open cell voltage (OCV);

C/ good distribution of the gases both at inlet and on recovery of the gases produced, to avoid loss of efficiency, nonuniformity of pressure and of temperature within the different elementary units or even excessive degradation of the cells; this corresponds to finding the lowest polarization resistance;

D/ good electrical contact and a sufficient area of contact between each cell and interconnector, in order to obtain the lowest ohmic resistance between cells and interconnectors.

High temperatures greatly complicate achievement of the three essential functions A/ to C/ mentioned above. Moreover, the fragility of the solid oxide cells imposes certain restrictive design rules for guaranteeing their mechanical integrity.

Various designs already exist for achieving the four essential functions A/ to D/ simultaneously, but there are still various difficulties to overcome.

In particular, regarding achievement of function B/, taking into account the high operating temperature ranges of HTE electrolysers and SOFC fuel cells, typically 600° C. to 1000° C., the seals are conventionally based on glass or glass-ceramic. A glass seal is in the pasty state at the working temperature.

At the design stage, it is necessary to take care not to expel the glass under the effect of a pressure difference applied on the seal. In the case of a glass-ceramic seal, it undergoes a thermal cycle in situ with the aim of causing it to crystallize and therefore make it solid at the working temperature. Just as with a glass seal, care must be taken not to expel the glass-ceramic before it is solid.

The simplest configuration consists of placing the glass between two dense plates, as opposed to the various porous materials present in an SOEC reactor or an SOFC fuel cell: surface tension prevents it from flowing, up to a certain pressure difference on either side of the seal.

To promote this behavior, it is necessary to reduce the height of the seal as far as possible, increase the area of the regions in contact with the glass and reduce the pressure difference to which the seal is subjected.

Achievement of this type of sealing based on glass in SOEC reactors or SOFC cells comes up against several problems. Firstly, the electrodes on either side of the cell are porous and therefore they simply cannot support a seal based on glass. Moreover, electrical insulation must be guaranteed between adjacent interconnectors, and this cannot be provided by a glass film that is too thin without risk. Finally, said glass must be squashed to reduce the height, as well as to guarantee electrical contact between cell and interconnectors. This clamping must be done avoiding any overhang of the cell to preserve its mechanical integrity.

In the configuration shown schematically in FIG. 3 and disclosed in patent application FR3000108, these constraints are partly taken into account by the density of the nonporous surfaces on either side of a seal: the cell C1 is kept flat on its support 2.1 (cathode in HTE or anode for SOFC) and clamped between two adjacent interconnectors 5, a first seal 61 and a second seal 62 of the glass or glass-ceramic type, separated by an electrical insulator 7 to prevent all-circuit, are arranged between interconnectors to provide hermeticity of the hydrogen produced (fuel supplied in SOFC) and finally, a third seal 63 of the same type is arranged beside the anode 4.1 (cathode in SOFC) between the electrolyte 3.1 and the interconnector 5 to provide hermeticity of the oxygen produced (or the air supplied in SOFC). Thus, each seal 61, 62, 63 is based on a support that is intrinsically impervious and therefore nonporous. Moreover, high surface tension between the seals and their support makes it possible to avoid flow of the glass up to a certain pressure difference on either side of a seal. To promote the attainment of good mechanical durability of the seal, the height of the seal must be reduced and the area of the regions in contact with the glass must be increased as far as possible.

As explained above, height reduction of glass or glass-ceramic seals is obtained by clamping. Clamping is also required to reduce the effect of the contact resistances in the stack, i.e. to provide the aforementioned function D/, i.e. good electrical contact between cell and interconnectors. Now, as shown in FIG. 3, an electrolysis cell C1, C2 . . . is mounted with an overhang owing to its seal 63. Thus, the clamping required for reducing the height of the seals and to provide function D/ of good electrical contact between cell and interconnectors must moreover be achieved without causing excessive bending of the cell, which could lead to breakage thereof.

Thus, configurations with a seal based on glass or glass-ceramic, like that illustrated in FIG. 3, have undeniable advantages of electrical insulation and accommodation of distortion between components of an HTE or SOFC stack.

This being so, as already mentioned, seals based on glass or glass-ceramic have intrinsically the major drawback of only withstanding small pressure differences, of the order of a few hundred millibars.

The internal operation of an SOFC cell or of an HTE reactor under pressure, typically from a few bar to some tens of bar, typically 30 bar, then requires a solution for preventing loss of hermeticity of the seals.

A solution is already known that consists of placing the HTE stack reactor or SOFC cell inside a sealed enclosure, also pressurized. Here we may mention patent applications or patents FR 2957361A1, US2002/0081471 and U.S. Pat. No. 6,689,499 B2, which disclose this type of solution. This known solution offers the advantage that the same pressure can be applied between the interior and the exterior of the stack. This therefore allows operation at high pressure, from some bar to some tens of bar, without mechanical stresses on the glass or glass-ceramic seals.

However, this means it is necessary to guarantee the mechanical behavior of an enclosure pressurized to these pressures, typically 30 bar, and which contains a stack at a high temperature, typically at 800° C. with circulation of hydrogen $H_2$ and oxygen $O_2$ within it. Management of the safety of this pressurized enclosure may not be trivial.

Moreover, the presence of the enclosure makes it complicated to maintain the clamping of the stack for guaranteeing good electrical contact between interconnectors and cells. In particular, positioning of the clamping elements in a relatively cold zone is not easy.

Finally, the pressurized enclosure must be made with passages that both go through and are impervious, for supply/recovery of gases and electric current from outside the enclosure. Thus, some of these passages must be electrical insulators and those containing steam must be at a controlled temperature so as to avoid any steam bursts. In fact, without temperature control in the inlet and/or outlet pipes, the steam circulating continuously inside may encounter a cold zone, and then condense uncontrollably. This causes bursts, which generate variations in gas and pressure supply.

All these precautions lead to a complete installation integrating the pressurized sealed enclosure and the HTE reactor or SOFC cell, which is complicated and expensive.

There is therefore a need to replace the existing configurations of electrolyzer (HTE) of the SOEC type or fuel cell of the SOFC type, which require the use of a pressurized sealed enclosure housing the HTE electrolyzer or the SOFC cell in order to prevent loss of hermeticity of seals based on glass or glass-ceramic.

One aim of the invention is to address this need at least partly.

SUMMARY OF THE INVENTION

For this purpose, according to one alternative the invention relates to a module that is intended to form an elementary unit of an electrolysis or co-electrolysis reactor of the SOEC type, comprising:
- a unit electrochemical cell formed from a cathode, an anode, and an electrolyte inserted between the cathode and the anode,
- a first device and a second device each forming an electrical and fluidic interconnector, each consisting of a component made of electron-conducting material and impervious to gases; the first and second interconnectors being arranged on either side of the elementary unit; the first interconnector having a steam supply line passing through it, opening onto the cell on the cathode side, and a line for recovery of the hydrogen produced, opening on the periphery of the cell on the cathode side so as to provide uniform distribution of the steam supplied and of the hydrogen produced, respectively, from the supply line to the recovery line; the second interconnector having a line for recovery of the oxygen produced passing through it, opening on the periphery of the cell on the anode side so as to provide uniform distribution of the oxygen produced to the recovery line;
- a first seal arranged at the periphery of the elementary unit and resting both against the first interconnector and against the second interconnector;
- a second seal arranged at the periphery of the anode of the elementary unit and resting both against the second interconnector and against the electrolyte; the first and second seals being based on glass and/or glass-ceramic;
- an insulating and sealing device consisting of an electrically insulating washer clamped by a third seal and a fourth seal that are not in contact with one another, the third and fourth seals being made of metal, the device being arranged at the periphery of the first seal with the third and fourth seals resting against the first and against the second interconnector, respectively;

module in which the first and/or the second interconnectors has (have) at least one supply line and at least one recovery line for a gas, called equalization gas, passing through it (them), opening onto the space delimited between the first seal and the insulating and sealing device so as to provide uniform distribution of the equalization gas from its supply line to its recovery line in order to equalize the pressures on either side of the first seal while the reactor is operating under pressure.

According to one variant, the second interconnector has a supply line for draining gas, such as air, passing through it and opening onto the cell on the anode side so as to provide uniform distribution of the draining gas supplied and of the oxygen produced, respectively, from the supply line to the recovery line.

According to another alternative, the invention also relates to a module that is intended to form an elementary unit of a fuel cell of the SOFC type, comprising:
- a unit electrochemical cell formed from a cathode, an anode, and an electrolyte inserted between the cathode and the anode,
- a first device and a second device each forming an electrical and fluidic interconnector, each consisting of a component; the first and second interconnector being arranged on either side of the elementary unit; the first interconnector having a fuel supply line, opening onto the cell on the anode side, and a recovery line for the water produced, opening on the periphery of the cell on the anode side, passing through it, so as to provide uniform distribution of the fuel supplied and of the water produced, respectively, from the supply line to the recovery line; the second interconnector having an air or oxygen supply line, opening onto the cell on the cathode side, and a recovery line for the surplus air or oxygen, opening on the periphery of the cell on the cathode side, passing through it, so as to provide uniform distribution of the air or oxygen, from the supply line to the recovery line;
- a first seal arranged at the periphery of the elementary unit and resting both against the first interconnector and against the second interconnector;

a second seal arranged at the periphery of the cathode of the elementary unit and resting both against the second interconnector and against the electrolyte; the first and second seals being based on glass and/or glass-ceramic;

an insulating and sealing device consisting of an electrically insulating washer clamped by a third seal and a fourth seal that are not in contact with one another, the third and fourth seals being made of metal, the device being arranged at the periphery of the first seal with the third and fourth seals resting against the first and against the second interconnector, respectively;

module in which the first and/or second interconnectors has (have) at least one supply line and at least one recovery line for a gas, called equalization gas, passing through it (them), opening onto the space delimited between the first seal and the insulating and sealing device so as to provide uniform distribution of the equalization gas from its supply line to its recovery line, in order to equalize the pressures on either side of the first seal while the cell is operating under pressure.

In other words, the invention consists essentially of a module comprising a circuit for circulation of a gas, additional to the reactive gases required for the electrolysis reaction or for the reverse reaction in an SOFC cell, the circuit being arranged so that, during operation under pressure, this additional gas will equalize, on one side of the seals based on glass and/or glass-ceramic, the pressure of the reactive gases generated on the other side.

Thus, there is no need for the solution employing a pressurized sealed enclosure as in the state of the art, inside which the HTE reactor or the SOEFC cell is housed.

The only seal that has to withstand the pressure difference between the interior, typically between 10 and 30 bar, and the exterior, typically equal to 1 bar, of the module, while being an electrical insulator, is that outside the circulation of the equalization gas, the stresses to which this seal is subjected being greater than those between anode and cathode compartments in which the reactive gases circulate.

According to an advantageous embodiment, the unit electrochemical cell, the first and second interconnectors, the first and second seals as well as the insulating and sealing device are of axisymmetric shape about a central axis (X), the supply lines for reactive gases (steam or fuel vapor), (draining gas, such as air, or air or oxygen) open onto the central axis (X).

According to an advantageous embodiment, the sealing device consists of an insulating washer with square or rectangular cross section and of third and fourth seals comprising, on each of their faces, one or more projections, preferably of triangular cross section, the apex of the projections of each of the third and fourth seals being arranged to deform by resting respectively on the insulating washer and on the first or on the second interconnector, in order to establish hermeticity both on the insulating washer and on each interconnector.

The third and fourth seals each comprise two projections opposite one another, in contact with the washer and the first or the second interconnector respectively, the projections being arranged to provide concentration of the force at the level of the contact between the seal and the seal seat, i.e. the component to be sealed. Thus, the projections make it possible to produce the desired hermeticity under a relatively low compressive load on either side of the seals.

Advantageously, the sealing device consists of an insulating washer based on zirconium oxide (zirconia) and of third and fourth seals that are based on iron-chromium-aluminum alloy of the Fecralloy® type.

According to an advantageous embodiment, the first and/or the second interconnector comprise(s) a first annular groove made between the first seal and the cell, the supply line of the first interconnector communicating with the first annular groove so as to effect radial distribution of the steam supplied and of the hydrogen produced or of the fuel supplied and of the water produced, to the recovery line of the first interconnector.

According to another advantageous embodiment, the second interconnector comprises a second annular groove made in a zone delimited by the second seal, the supply line of the second interconnector communicating with the second annular groove so as to effect radial distribution of the oxygen produced or of the air supplied, to the recovery line of the second interconnector. Each of these first and second annular grooves provides good uniformity of radial distribution of the gas on the electrode in question, regardless of the level of pressure.

According to an advantageous embodiment, the first and/or second interconnector comprise(s) a third annular groove made on the periphery of the interconnectors, in which the third seal or the fourth seal and the insulating washer are arranged, the arrangement being such that the insulating washer projects from the third annular groove. This third annular groove facilitates the assembly and the mechanical stability of the three components of the sealing device. Moreover, the projecting arrangement of the insulating washer makes it possible to guarantee absence of short-circuiting between the interconnectors.

According to an advantageous embodiment, the first seal consists of a mica washer with slits, within which a glass or glass-ceramic bead is deposited, filling the slits in the mica after clamping the module.

According to another advantageous embodiment, the first seal consists of a mica washer with slits, the mica washer being clamped between two glass-ceramic washers, each resting respectively on the first and the second interconnectors and filling the slits in the mica after clamping the module.

Once fitted by clamping, the glass or the glass-ceramic fills the slits in the mica and provides a good seal between the interconnectors.

Advantageously, the module comprises electrical contact elements, preferably metal grids, between each of the electrodes and one or other of the interconnectors. Preferably, it may be a nickel grid for contact with the $H_2/H_2O$ electrode and a gold or platinum grid for contact with the $O_2$ electrode. A layer of ceramic of the LSM type may also be envisaged for contact with the $O_2$ electrode.

Preferably, the metal component of the first and/or second interconnector is (are) of ferritic steel with about 20% chromium, preferably of CROFER® 22APU or F18TNb, or nickel-based of the Inconel® 600 or Haynes 230® type.

The invention also relates to an electrolysis or co-electrolysis reactor of the SOEC type or fuel cell of the SOFC type comprising a stack of modules that have just been described.

Advantageously, the HTE reactor or the SOFC cell comprises mechanical means for assembling the interconnectors together, suitable for preventing opening of the modules but not for clamping one interconnector on the other by compression. In other words, these mechanical means for assembly prevent inopportune opening of the modules, which ensures safe operation, but not clamping of the cell between the adjacent interconnectors by compression. Clamping, which guarantees hermeticity and electrical contact, is moreover effected by applying a very suitable compressive force of one interconnector on the other. The chains of dimensions of all the components of the module are determined to guarantee squashing of the seals of the device at the periphery, as well as optional squashing of the electrical contact layers. Typically, the squashing produced by clamping is of some tens of microns. Of course, the clamping force by compression has to be adjusted when the pressure rises inside the module according to the invention.

The mechanical means for assembly may comprise one or more bolts mounted passing through in housings made in the interconnectors, the head of each through bolt resting in a housing of one of the end interconnectors of the stack and a nut screwed on the through bolt projecting from the other end interconnector of the stack, the head and/or the nut resting directly or indirectly on an electrical insulating sleeve mounted in at least one of the housings. Bolts are easy to use and are reliable for guaranteeing the necessary safety, i.e. preventing opening of the modules during operation if there is an increase in pressure.

According to another of its aspects, the invention also relates to a method of operating an HTE electrolysis or co-electrolysis reactor as above, according to which:
the supply lines of the first interconnector are supplied with steam or with a mixture of steam and another gas selected from carbon dioxide and nitrogen dioxide and simultaneously the supply lines for gas for pressure equalization, the pressure of the steam or of the mixture supplied being roughly equal to that of the equalization gas;
the hydrogen or hydrogen and carbon monoxide or nitrogen monoxide produced by electrolysis or co-electrolysis of the steam, and simultaneously the equalization gas, are recovered in their respective recovery line.

According to an advantageous embodiment, the supply lines of the second interconnector are supplied with draining gas, such as air, the pressure of the draining gas supplied being roughly equal to that of the equalization gas, and the oxygen produced is recovered.

According to another of its aspects, the invention also relates to a method for operating an SOFC fuel cell as above, according to which:
the supply lines of the first interconnector are supplied with fuel, such as hydrogen or methane, and simultaneously the supply lines with pressure equalizing gas;
the supply lines of the second interconnector are supplied with air or oxygen, the pressure of the fuel and air or oxygen supplied being roughly equal to that of the equalization gas;
the surplus fuel, the equalization gas, the water produced on the one hand and the surplus air or oxygen on the other hand, are recovered in their respective recovery line.

According to one variant, the temperature of the equalization gas is regulated so that the latter controls the operating temperature of the HTE electrolysis or co-electrolysis reactor or of the SOFC fuel cell.

Advantageously, the equalization gas is air, a neutral gas, hydrogen and/or steam.

Air is preferably selected for the nominal operating mode of an HTE reactor or an SOFC cell.

According to an advantageous embodiment, any leakages of the fuel or of the products entering or leaving the electrolysis/co-electrolysis reactor or the SOFC fuel cell are detected by analysis of the flow rate of the mixture of equalization gas at the outlet of its recovery line, and then the flow rate of air as equalization gas is adjusted at the inlet of its supply line in order to burn the leaks that are detected.

In fact, with air it is possible to reduce the pressure difference at lower cost, and moreover it has the following advantages:
in the case of slight leaks from the sealing device at the periphery of the module, these leaks can be compensated with a high flow rate of air injected in the interconnectors;
in the case of slight leaks from the seal based on glass-ceramic and/or glass that provides hermeticity of the compartment in which the hydrogen circulates, air injected in the interconnectors makes it possible to burn any leaking hydrogen and thus offers safety with respect to the external atmosphere.

Burning the leaks prevents any accumulation of an explosive mixture in the electrolysis/co-electrolysis reactor or SOFC fuel cell.

In the nominal operating mode of an HTE reactor or of an SOFC cell, notably due to loss of hermeticity of the first seal, the equalization gas selected is preferably hydrogen $H_2$ and/or steam $H_2O$ when hermeticity is maintained with respect to the exterior of the module, and a neutral gas when there is a concomitant loss of hermeticity with respect to the exterior.

Thus, the equalization gas according to the invention not only has the function of managing the pressure difference between the interior or the exterior of an HTE reactor or of an SOFC fuel cell, and therefore of providing reliable operation under pressure, but it also makes it possible to burn the gas leaks.

Moreover, the equalization gas may advantageously have a role of thermal regulation of an HTE reactor or of an SOFC fuel cell.

Preferably, the unit electrochemical cells are of the cathode-supported type.

Here, and in the context of the invention, "cathode-supported cell" has the definition already used in the field of high-temperature electrolysis of water HTE, and is designated by the acronym CSC, i.e. it is a cell in which the electrolyte and the oxygen electrode (anode) are arranged on the thicker hydrogen electrode (cathode), which therefore serves as a support.

DETAILED DESCRIPTION

Figure 13:
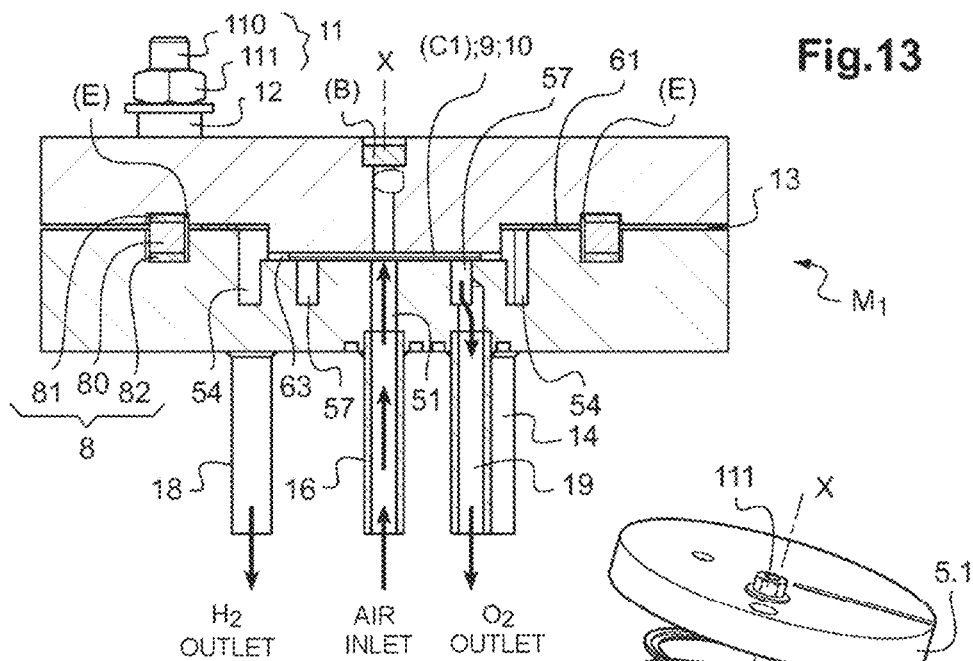
Figure 14:
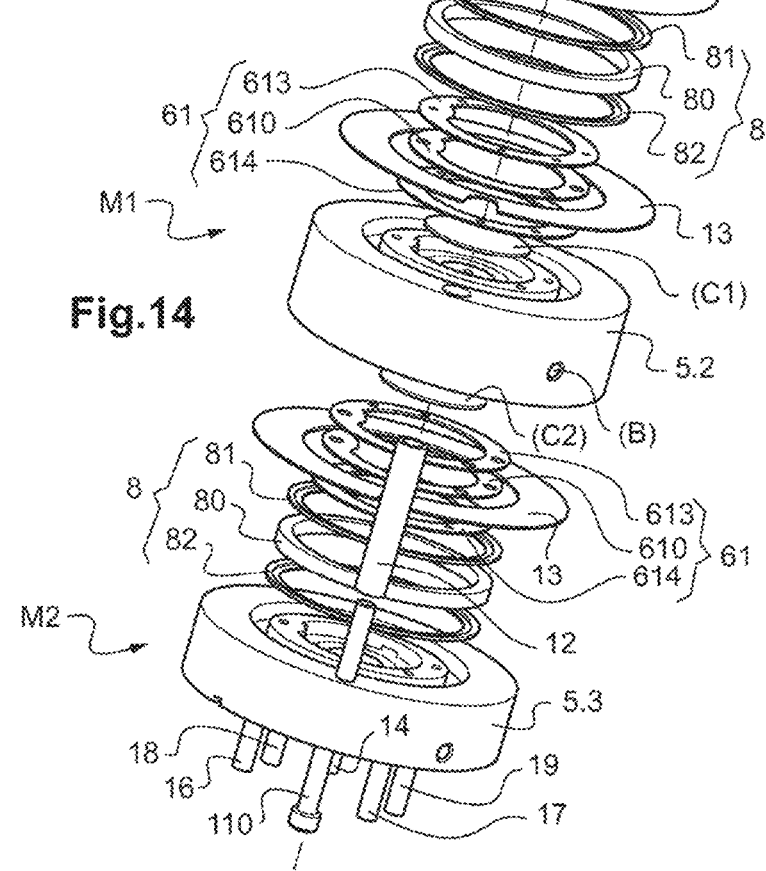
Figure 15:
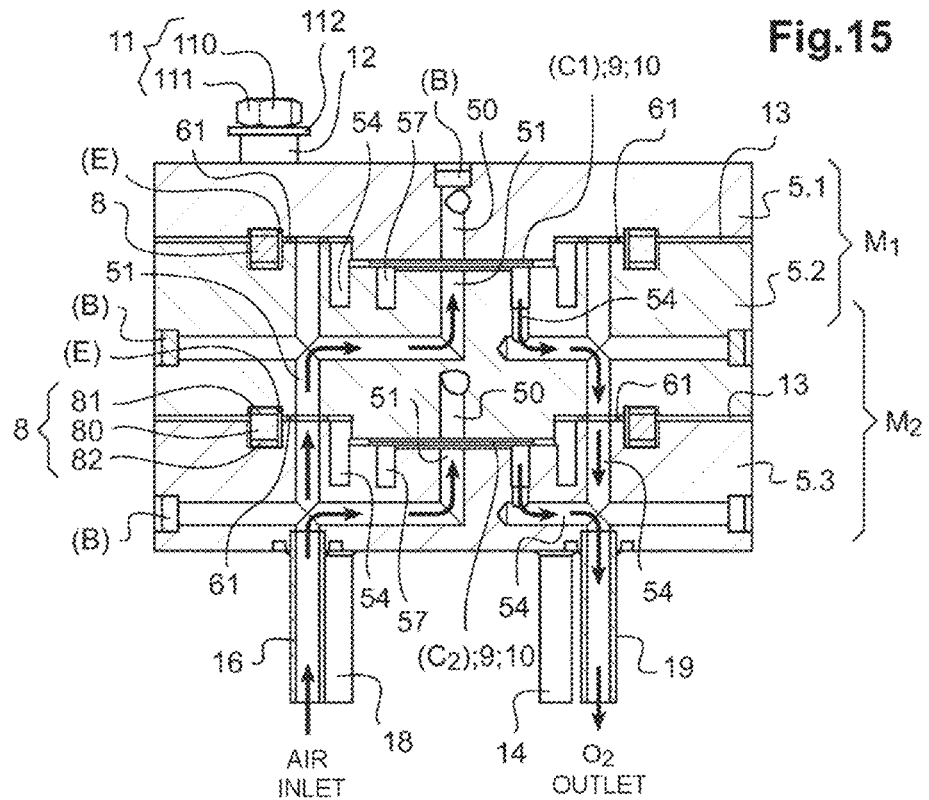
Figure 16:
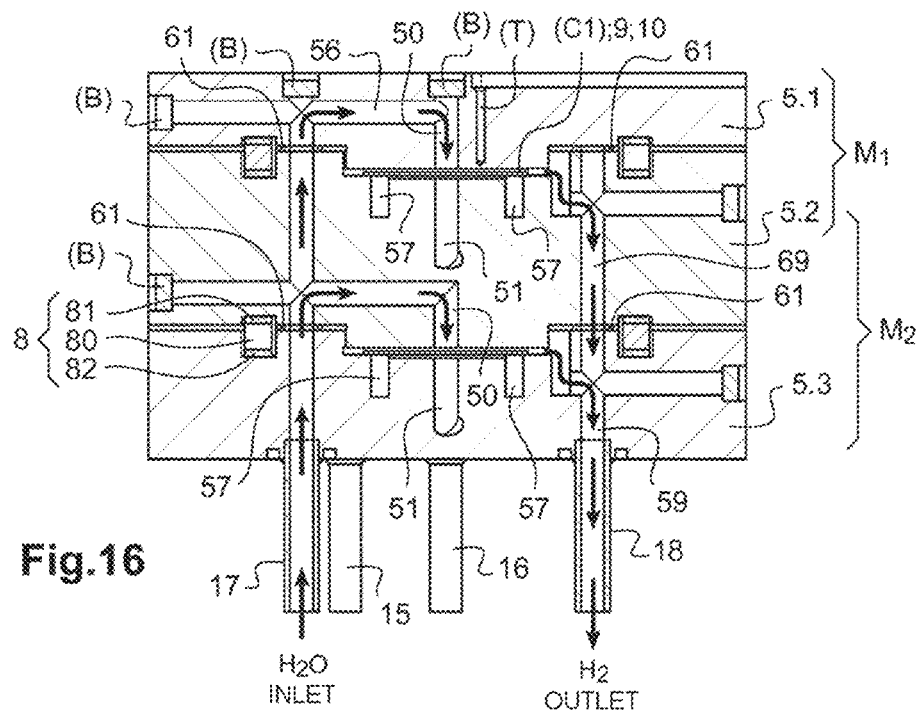
Figure 17:
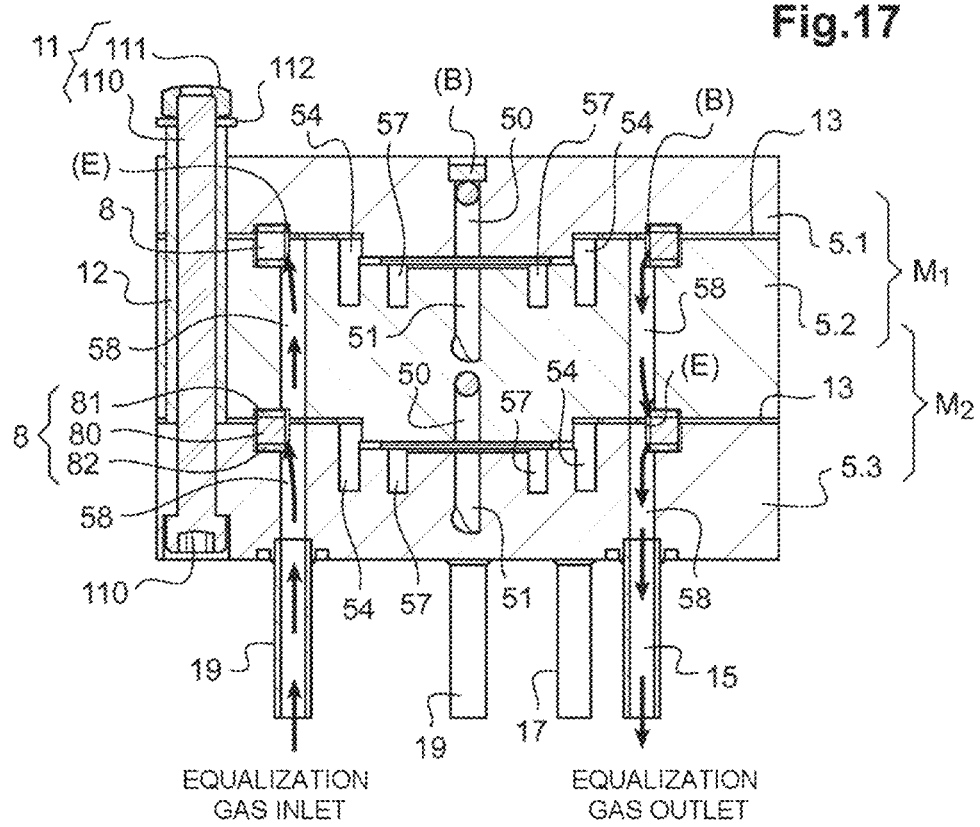
Figure 18:
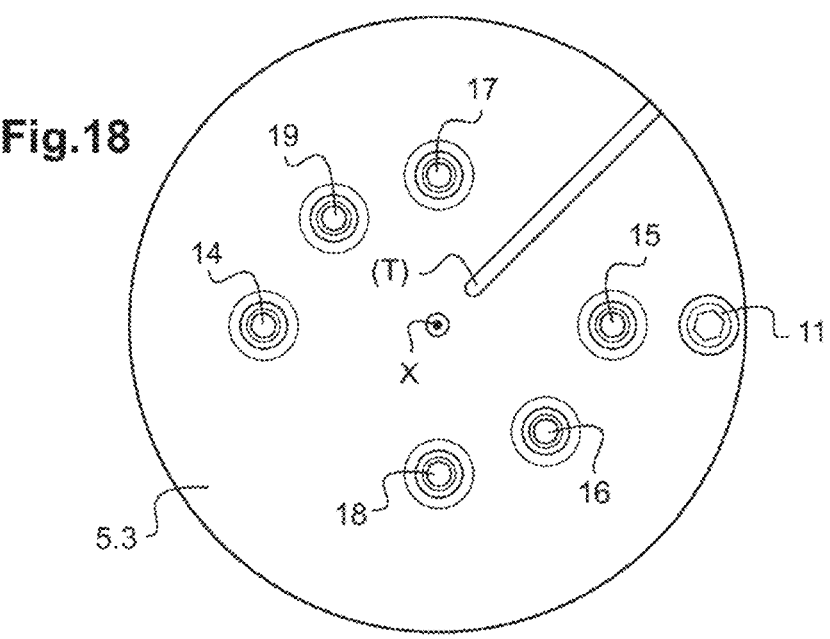

Other advantages and features of the invention will become clearer on reading the detailed description of embodiment examples of the invention, which is provided for purposes of illustration and is nonlimiting, referring to the following figures, where:

FIG. 1 is a schematic view showing the operating principle of a high-temperature water electrolyzer, FIG. 2 is an exploded schematic view of a part of a high-temperature steam electrolyzer (HTE) of the SOEC type comprising interconnectors according to the state of the art, FIG. 3 is a schematic partial sectional view of an HTE electrolyzer or of a fuel cell of the SOFC type according to the state of the art showing the configuration of the seals and of the electrical contacts within the stack, FIG. 4 is a schematic sectional view of a module for an HTE electrolyzer or for a fuel cell of the SOFC type according to a first embodiment of the invention showing the configuration of the seals, of the electrical contacts and of the distribution of the gases within the stack, FIG. 5 is a schematic view of the sectional detail in FIG. 4, showing the advantageous configuration of the insulating and sealing device between the interior and the exterior of a module according to the invention, FIG. 6 is a photographic reproduction of a sealing device suitable for providing hermeticity between the interior and the exterior of a module according to the invention, FIG. 7A is a photographic reproduction showing the underside of an upper interconnector of a module according to the invention, prior to its assembly with the lower interconnector shown in FIGS. 7B and 7C, FIGS. 7B and 7C are photographic reproductions showing the top of a lower interconnector of a module according to the invention, before and after fitting the seals, respectively, FIGS. 8A and 8B are digital simulation views of an interconnector according to the invention respectively with and without a groove for radial distribution of a reactive gas between its axial supply line and its peripheral recovery line, FIG. 9 is an exploded view of one embodiment of a module according to the invention for an HTE reactor, FIG. 10 is a sectional view of an assembled module according to FIG. 9, the section being made in the plane of circulation of the equalization gas, FIG. 11 is a detail view from FIG. 10, showing passage of the equalization gas in the grooves for housing the insulating and sealing device between the interior and the exterior of a module according to the invention, FIGS. 12 and 13 are sectional views of an assembled module according to FIG. 9, the section being made respectively in the plane of circulation of the steam supplied and of the hydrogen produced, and in the plane of circulation of the air supplied and of the oxygen produced, FIG. 14 is an exploded view of one embodiment of an HTE electrolysis reactor with a stack of two modules according to the invention, FIGS. 15, 16 and 17 are sectional views of an assembled module according to FIG. 14, the section being made respectively in the plane of circulation of the air supplied and of the oxygen produced, in the plane of circulation of the steam supplied and of the hydrogen produced, and finally in the plane of circulation of the equalization gas, FIG. 18 is a view of the underside of an electrolysis reactor according to FIGS. 14 to 17.

FIGS. 1 to 3, relating to the state of the art, have already been discussed in the preamble. Therefore they are not discussed in detail below.

For the sake of clarity, the same elements of an HTE electrolysis reactor according to the state of the art and of an HTE electrolysis reactor according to the invention are denoted by the same numerical references.

It is to be noted here that throughout the present application, the terms "lower", "upper", "above", "under", "interior", "exterior", "internal" and "external" are to be understood by reference to an interconnector according to the invention in a cross-sectional view along the axis of symmetry X.

It should also be noted that the modules of electrolyzers or of fuel cells described are of the solid-oxide type (SOEC, acronym of Solid Oxide Electrolyte Cell or SOFC, acronym of Solid Oxide Fuel Cell) operating at high temperature.

Thus, all the constituents (anode/electrolyte/cathode) of an electrolysis cell or of a fuel cell are ceramics. The high operating temperature of an electrolyzer (electrolysis reactor) or of a fuel cell is typically between 600° C. and 1000° C.

Typically, the characteristics of a unit electrolysis cell SOEC suitable for the invention, of the cathode-supported type (CSC), may be those as shown below in Table 2.

TABLE 2

| Electrolysis cell | Unit | Value |
|---|---|---|
| Cathode 2 | | |
| Material | | Ni-YSZ |
| Thickness | μm | 315 |
| Thermal conductivity | $W\ m^{-1}\ K^{-1}$ | 13.1 |
| Electrical conductivity | $\Omega^{-1}\ m^{-1}$ | $10^5$ |
| Porosity | | 0.37 |
| Permeability | $m^2$ | $10^{-13}$ |
| Tortuousness | | 4 |
| Current density | $A \cdot m^{-2}$ | 5300 |
| Anode 4 | | |
| Material | | LSM |
| Thickness | μm | 20 |
| Thermal conductivity | $W\ m^{-1}\ K^{-1}$ | 9.6 |
| Electrical conductivity | $\Omega^{-1}\ m^{-1}$ | $1\ 10^4$ |
| Porosity | | 0.37 |
| Permeability | $m^2$ | $10^{-13}$ |
| Tortuousness | | 4 |
| Current density | $A \cdot m^{-2}$ | 2000 |
| Electrolyte 3 | | |
| Material | | YSZ |
| Thickness | μm | |
| Resistivity | Ωm | 0.42 |

FIG. 4 shows a schematic sectional view of a module M1 intended to form the elementary unit of an HTE steam electrolyzer according to the invention.

The module M1 comprises a unit electrochemical cell (C1) of axisymmetric shape about a central axis X, the cell being formed from a cathode, an anode, and an electrolyte inserted between the cathode and the anode, two electrical and fluidic interconnectors 5.1, 5.2 on either side of the cell.

The two interconnectors 5.1, 5.2 are each made as a single metal component, preferably of ferritic steel with about 20% chromium, preferably of CRObER® 22APU or F18TNb, or nickel-based of the Inconel® 600 or Haynes® type.

The upper interconnector 5.1 has a steam supply line 50 passing through it, and opening along the central axis onto the cell on the cathode side. As will be explained later, radial distribution is provided for the steam supplied and the hydrogen produced to a line 59 for recovery of the hydrogen produced, opening parallel to the central axis at the periphery of the cell on the cathode side.

The lower interconnector 5.2 has a line 51 for supply of draining gas, such as air, passing through it and opening along the central axis onto the cell on the anode side. As will be explained later, radial distribution is provided for the air supplied and for the oxygen produced to a line 54 for recovery of the oxygen produced, opening parallel to the central axis at the periphery of the cell on the anode side.

A first seal 61 of axisymmetric shape about the central axis X is arranged at the periphery of the elementary unit C1 and resting against each of the two interconnectors. This seal is provided for providing hermeticity around the cathode compartment.

A second seal 63 of axisymmetric shape about the central axis is arranged at the periphery of the anode of the elementary unit and resting both against the lower interconnector and against the electrolyte. This seal is provided for providing hermeticity around the anode compartment. The seals 61 and 63 are based on glass and/or glass-ceramic, as will be described in detail later.

According to the invention, an electrical insulation and sealing device 8 of axisymmetric shape about the central axis X is arranged at the periphery of the first seal around the cathode compartment.

The device 8 consists of an electrically insulating washer 80 forming a block that is clamped by third and fourth metal seals 81, 82 that are not in contact with one another. Each of these third and fourth seals 81, 82 is made of metal and rests against the upper and lower interconnector respectively.

The lower interconnector 5.2 has at least one supply line 58 for a gas, called equalization gas, and at least one recovery line 58 for this equalization gas, passing through it, and opening onto the annular space E delimited between the seal 61 and the device 8 so as to provide annular distribution of the equalization gas for equalizing the pressures on either side of the first seal 61 during operation.

The device 8 is able to withstand a large pressure difference between the pressure of the equalization gas, which is adjusted to a value as close as possible to the operating pressure of the HTE reactor, typically from 10 to 30 bar, and the pressure outside the module, typically 1 bar. The insulating washer 80 prevents any short-circuiting between the lower interconnector 5.2 and the upper interconnector 5.1. Finally, the metal seals are such that they display expansion compatible with the materials of the interconnectors, notably interconnectors based on ferritic stainless steel.

According to a variant illustrated in FIGS. 5 and 6, the insulating washer or block 80 is made of zirconia and the two metal seals 81, 82 are based on alloy comprising chromium and iron, for example Fecralloy®.

The upper metal seal 81 comprises, on each of its faces, a projection 83, 84 of triangular cross section.

The lower metal seal 82 is identical to the upper seal 81 and comprises, on each of its faces, a projection 85, 86 of triangular cross section.

Thus, the shape of cross section of each seal 81, 82 that rests respectively on the washer 80 and one of the interconnectors 5.1, 5.2 is a general diamond shape.

The apex of these triangular projections 83 to 86 is able to deform by resting respectively on the insulating washer 80 and on the first interconnector 5.1 or on the second 5.2 interconnector, in order to establish hermeticity both on the insulating washer and on each interconnector. Thus, during compression clamping of an HTE reactor comprising the module M1, the triangular projections 83 to 86 made of ductile material make it possible to concentrate the compressive strains, which avoids excessive compression of the whole insulating and sealing device 8.

This variant makes it possible to establish the required hermeticity under a large pressure difference with a relatively low compressive load.

Typically, the compressive load is equal to a value from 5 to 10 N/mm of seal increased by a value for compensating the background effect due to the pressure. This compressive load corresponds to the clamping of the seal to obtain hermeticity without pressure and maintaining this clamping for all pressure levels. In fact, the pressure during operation will generate a loosening force with a value F equal to the pressure multiplied by the area of the disk on which the pressure is applied. Thus, this loosening force must be compensated by the compensating value otherwise the two interconnectors will separate from one another.

FIGS. 7A to 7C and 9 to 13 show one embodiment of a module according to the invention.

It is to be noted here that the plugs (B) shown in these figures serve for sealing, by welding, the holes that are made in the interconnector components for delimiting the lines for supply and recovery of the gases. However, once the interconnectors are finished, they have no function in the operation of an HTE reactor according to the invention.

In addition to what has already been described, the upper interconnector 5.1 has a lateral supply line 52 passing through it, opening into the central supply line 50, as can be seen in FIGS. 7A and 12. The upper interconnector also comprises an annular groove 53 for receiving the upper metal seal 81 and the insulating block 80 (FIGS. 7A, 10 and 11).

Regarding the lower interconnector 5.2, it comprises a seating, on which both the second seal 63 and the elementary unit are positioned. From the immediate periphery of the cell to the exterior, the lower interconnector 5.2 comprises an annular groove 54 for radial flow of the $H_2O/H_2$ mixture, a flat surface and another annular groove 55 concentric with that around the cell for receiving the sealing device 8. The flat surface has a lateral supply line passing through it, which is intended to communicate with the central supply line 51 of the upper interconnector 5.1, as can be seen in FIGS. 7B and 13.

As can be seen in FIG. 7C, the flat surface of the lower interconnector serves as a support for the seal 61 and around the lateral supply line 56. In FIG. 7C, it can be seen that the seal 61 preferably comprises a mica washer or ring 610 having slits 611 in which a glass or glass-ceramic bead 612 is provided. During clamping, this glass or glass-ceramic bead 612 will flow into the slits 611 and thus create a firmly adhering bond between the two interconnectors 5.1 and 5.2, which is moreover wedged laterally by the mica ring 610.

As can be seen in FIG. 14, in place of a bead 612 penetrating into the slits 611, we may envisage clamping the mica ring 610 between two glass-ceramic washers or rings 613, 614, with each resting on the first interconnector 5.1 and the second interconnector 5.2, respectively.

Finally, in FIG. 7C, it can also be seen that the insulating washer 80 projects from the lower interconnector 5.2, when housed in the annular groove 55 of the latter.

As shown in FIGS. 10 and 11, the lower interconnector has an annular groove 55 passing through it and opening into the supply line 58 and recovery line 58 for the equalization gas.

Each of these lines for supply 58 and recovery 58 of the equalization gas opens into the groove 55 for housing the sealing device 8 (FIGS. 10 and 11). According to the invention, a lateral clearance is provided for mounting the sealing device 8 in grooves 53, 55 of the upper interconnector 5.1 and lower interconnector 5.2 respectively, which is sufficient to allow passage of the equalization gas in the annular space (E) thus defined between device 8 and the interior of the grooves 53, 55. As shown in detail in FIG. 11, it is the passage made at the bottom of the hole for the supply line 58 inside the sealing device 8 that allows the equalization gas to reach the annular space (E) and thus provide annular distribution of the latter. This annular distribution of the equalization gas forms, as it were, a peripheral curtain of gas around the compartments of reactive gases, which makes it possible to equalize the pressures.

Owing to the presence of the grooves 54, 57 for distribution of the reactive gases on the lower interconnector 5.2, the module according to the invention with the two interconnectors and the cell with axisymmetric geometry about axis X allows uniform radial supply of the cell with reactive gases whatever the pressure level.

To demonstrate the advantages in operation of a module M1 according to the invention with these grooves compared to a module without these grooves, the inventors undertook, using commercially available software, for example the software called "Fluent", simulations for calculating the uniformity of distribution of gases on the cathode of an electrolysis cell.

FIGS. 8A and 8B illustrate these simulations based on the flow velocity with and without the annular groove 54, respectively. It is to be noted that the inlet conditions simulated a velocity of flow in supply line 50 for a mixture at 90% $H_2O$ and 10% $H_2$, at a flow rate equal to 3.7 Nml/min, at a pressure of 15 bar and at 800° C.

It is clear from these figures that it is necessary to introduce sufficient head losses upstream of the recovery line 59 in order to guarantee uniform radial flow. In fact, in FIG. 7A, it can clearly be seen that without the groove, the $H_2O/H_2$ mixture only supplies the cell zone between the central supply line 50 and the lateral outlet line 59. Conversely, with a groove 54 at the periphery, the axial symmetry of the distribution on the cell is indeed preserved.

As illustrated in FIG. 9, the module M1 according to the invention may advantageously comprise electrical contact grids 9, 10, which may notably have the effect of compensating defects of flatness in order to obtain better electrical contact between the upper interconnector and the cathode on the one hand and between the lower interconnector and the anode on the other hand.

Advantageously, as can be seen in FIG. 9, the module M1 may comprise, at the periphery of the insulating and sealing device 8, an electrically insulating ring 13, of the type made of mica, and ring 13 will rest on all the zones where the two peripheral surfaces of the interconnectors 5.1 and 5.2 are opposite one another.

FIGS. 14 to 18 show an HTE electrolysis reactor comprising two modules M1, M2, each constructed like that described above, stacked one on top of the other.

In this reactor, the lower interconnector 5.2 of the upper module Mi and the upper interconnector 5.2 of the lower module M2 are made in the same metal alloy component.

As can be seen in FIGS. 15 and 16, the various vertical and horizontal holes through the superposed interconnectors 5.1 to 5.3 make it possible to provide at the periphery and then along the central axis X, the lines for supply respectively of air 51 (FIG. 15) and of steam 56, 50 (FIG. 16), and at the periphery for the lines for recovery 54 of the oxygen produced and 59 of hydrogen, respectively, for each electrolysis cell C1, C2.

As can be seen in FIG. 17, the various vertical holes through the superposed interconnectors 5.1 to 5.3 make it possible to provide, at the periphery, the lines for supply and recovery 58 of the equalization gas around each electrolysis cell C1, C2.

According to an advantageous embodiment, the module or the reactor according to the invention incorporates a bolt 11 mounted passing through housings made in the interconnectors. As shown in FIGS. 10 and 17, the head 110 of the through bolt 11 rests in a housing of an end interconnector 5.2 or 5.3 and a nut 111 screwed on the through bolt projects on the other end interconnector 5.1, the nut 111 being supported indirectly by means of a washer 112 on an electrical insulating sleeve 12 mounted in the housing of the upper interconnector 5.2 or 5.1. The bolt 11 prevents inopportune opening of each module during operation under pressure, which ensures safe operation, but not clamping by compression of each cell between the interconnectors. Clamping, which guarantees hermeticity and electrical contact, is achieved by applying a very suitable compressive force of one interconnector on the other. The chains of dimensions of all the components of the modules are determined to guarantee squashing of the seals 81, 82 at the periphery, as well as optionally that of the electrical contact grids 9, 10. Typically, the squashing produced by clamping is some tens of microns. Of course, care is taken that the clamping force by compression is adjusted when the pressure rises inside the module according to the invention.

Finally, several pipes are connected to the various lines for supply and recovery of the gases made in the interconnectors as follows:
  a lateral supply pipe 14 for the equalization gas is connected to the lateral supply line 58 of the lower interconnector 5.2 or 5.3, whereas a pipe for recovery 15 of the equalization gas is connected to the lateral recovery line 58 of the lower interconnector (FIGS. 10, 17 and 18);
  a central air supply pipe 16 is connected to the central supply line of the lower interconnector 5.2 or 5.3 (FIGS. 12, 13, 15 and 18), whereas a pipe for recovery 19 of the oxygen produced is connected to the annular groove 57 of the lower interconnector 5.2 or 5.3 (FIGS. 12, 13, 15 and 18);
  a central steam supply pipe 17 is connected to the lateral supply line of the lower interconnector 5.2 or 5.3, itself opening into that of the upper interconnector 5.1 (FIGS. 13, 16 and 18), whereas a pipe for recovery 18 of the hydrogen produced is connected to the lateral recovery line 59 of the lower interconnector (FIGS. 13, 16 and 18).

We shall now describe the operation of an HTE electrolysis reactor comprising several modules according to the invention that have just been described, the modules being stacked on top of one another, like that shown in FIGS. 14 to 18.

Pipe 17 is supplied with steam and therefore the steam supply lines 56, 52 and 50 and simultaneously pipe 14 with equalization gas and therefore supply line 58 and the annular space E, the pressure of the steam supplied being roughly equal to that of the equalization gas.

Simultaneously, pipe 16 is also supplied with air, as draining gas, and therefore supply line 51, the pressure of the air supplied being roughly equal to that of the equalization gas.

The steam distributed radially from supply line 50 and the hydrogen produced by electrolysis of the steam circulates in the annular groove 54 and then is recovered radially in the recovery line 59 and therefore by the recovery pipe 18 (FIGS. 12 and 16).

The equalization gas circulates in the annular space E and is recovered in the recovery line 58 and therefore via the recovery pipe 15 (FIGS. 10 and 17).

The air distributed radially from supply line 51 and the oxygen produced by electrolysis of the steam circulates radially in the annular groove 57 and then is recovered via the recovery pipe 19 (FIGS. 13 and 15).

In module M1 or the reactor with stacked modules M1, M2 according to the invention, no supply current passes through the set of pipes 14 to 19.

Other variants and advantages of the invention may be realized while remaining within the scope of the invention.

For example, a hole may be made in one or other of the two interconnectors of a module for passing means of instrumentation through, such as a thermocouple (T) as shown in FIG. 12.

Although described for high-temperature electrolysis of water, module M1 according to the invention or the reactor with stacked modules M1, M2 may also be used for co-electrolysis of steam mixed either with carbon dioxide or with nitrogen dioxide.

Although described for high-temperature electrolysis of water, module M1 according to the invention or the reactor with stacked modules M1, M2 may also be used as an SOFC fuel cell. In this case, the supply pipes 17 are supplied with fuel, for example with hydrogen or methane, pipes 14 are still supplied with equalization gas and pipes 16 are supplied with air or oxygen.

The invention is not limited to the examples that have just been described; features of the examples illustrated may notably be combined with one another in variants that are not illustrated.

The invention claimed is:

1. A module that is intended to form an elementary unit of an electrolysis or co-electrolysis reactor of the SOEC type, comprising:
    a unit electrochemical cell (C1) formed from a cathode, an anode, and an electrolyte inserted between the cathode and the anode,
    a first device and a second device, each forming an electrical and fluidic interconnector, each consisting of a component made of electron-conducting material and impervious to gases; the first and second interconnectors being arranged on either side of the elementary unit; the first interconnector having a steam supply line passing through it, opening onto the cell on the cathode side, and a line for recovery of the hydrogen produced, opening on the periphery of the cell on the cathode side so as to provide uniform distribution of the steam supplied and of the hydrogen produced, respectively, from the steam supply line to the recovery line; the second interconnector having a recovery line for the oxygen produced passing through it, opening on the periphery of the cell on the anode side so as to provide uniform distribution of the oxygen produced to the recovery line;
    a first seal arranged at the periphery of the elementary unit and resting both against the first interconnector and against the second interconnector;
    a second seal arranged at the periphery of the anode of the elementary unit and resting both against the second interconnector and against the electrolyte; the first and second seals being based on glass and/or glass-ceramic;
    an insulating and sealing device consisting of an electrically insulating washer clamped by a third seal and a fourth seal that are not in contact with one another, the third and fourth seals being made of metal, the insulating and sealing device being arranged at the periphery of the first seal with the third and fourth seals resting against the first interconnector and against the second interconnector, respectively; and
    the module in which the first and/or second interconnectors has (have) the steam supply line and at least one recovery line for a gas, called equalization gas, passing through it (them), each opening into an annular space delimited between the first seal and the insulating and sealing device so as to provide uniform distribution of the equalization gas from its supply line to its recovery line, in order to equalize the pressures on either side of the first seal while the reactor is operating under pressure.

2. The module as claimed in claim 1, wherein the second interconnector has a supply line for draining gas, passing through it, on the cell on the anode side so as to provide uniform distribution of the draining gas supplied and of the oxygen produced, respectively, from the steam supply line to the recovery line.

3. A module that is intended to form an elementary unit of a fuel cell of the SOFC type, comprising:
    a unit electrochemical cell (C1) formed from a cathode, an anode, and an electrolyte inserted between the cathode and the anode,
    a first device and a second device, each forming an electrical and fluidic interconnector, each consisting of a component made of electron-conducting material and impervious to gases; the first and second interconnector being arranged on either side of the elementary unit; the first interconnector having a fuel supply line passing through it, an opening onto the cell on the anode side, and a recovery line for the water produced, at the periphery of the cell on the anode side so as to provide uniform distribution of the fuel supplied and of the water produced, respectively, from the fuel supply line to the recovery line; the second interconnector having an air or oxygen supply line passing through it, an opening onto the cell on the cathode side, and a recovery line for the surplus air or oxygen, an opening on the periphery of the cell on the cathode side so as to provide uniform distribution of the air or oxygen, from the supply line to the recovery line;
    a first seal arranged at the periphery of the elementary unit and resting both against the first interconnector and against the second interconnector;
    a second seal arranged at the periphery of the cathode of the elementary unit and resting both against the second interconnector and against the electrolyte; the first and second seals being based on glass and/or glass-ceramic;
    an insulating and sealing device consisting of an electrically insulating washer clamped by a third seal and a fourth seal that are not in contact with one another, the third and fourth seals being made of metal, the device being arranged at the periphery of the first seal with the third and fourth seals resting against the first interconnector and against the second interconnector, respectively; and
    the module in which the first and/or second interconnectors has (have) the fuel supply line and at least one recovery line for a gas, called equalization gas, passing through it (them), opening into an annular space (E) delimited between the first seal and the insulating and sealing device so as to provide uniform distribution of the equalization gas from its supply line to its recovery line, in order to equalize the pressures on either side of the first seal while the cell is operating under pressure.

4. The module as claimed in claim 1 or claim 3, the first and/or the second interconnector comprising a first groove provided between the first seal and the cell (C1), the supply line of the first interconnector communicating with the first groove so as to provide uniform distribution of the steam supplied and of the hydrogen produced or of the fuel supplied and of the water produced, to the recovery line of the first interconnector.

5. The module as claimed in claim 1 or claim 3, the second interconnector comprising a second groove provided in a zone delimited by the second seal, the supply line of the second interconnector communicating with the second groove so as to provide uniform distribution of the oxygen produced or of the air supplied, to the recovery line of the second interconnector.

6. The module as claimed in claim 1 or claim 3, the first and/or the second interconnector comprising a third groove provided at the periphery of the interconnectors and in which the third or the fourth seals and the insulating washer are arranged, the arrangement being such that the insulating washer projects from the third groove.

7. The module as claimed in claim 1 or claim 3, the unit electrochemical cell (C1), the first interconnector and the second interconnector, the first seal and the second seal as well as the insulating and sealing device (8) being of axisymmetric shape about a central axis (X), the steam supply line or the fuel supply line for reactive gases (steam or fuel) and a draining gas supply line opening out along the central axis (X).

8. The module as claimed in claim 1 or claim 3, the sealing device consisting of the insulating washer of square or rectangular cross section and of third and fourth seals comprising, on each of their faces, one or more projections, the apex of the projections being arranged to deform by resting respectively on the insulating washer and on the first or on the second interconnector, in order to establish hermeticity both on the insulating washer and on each interconnector.

9. The module as claimed in claim 1 or claim 3, the sealing device consisting of an insulating washer based on zirconium oxide (zirconia) and of third and fourth seals based on iron-chromium-aluminum alloy.

10. The module as claimed in claim 1 or claim 3, the first seal consists of a mica washer having slits, the mica washer being clamped between two glass-ceramic washers each resting on the first and the second interconnectors respectively.

11. The module as claimed in claim 1 or claim 3, comprising electrical contact elements, between each of the electrodes and one or other of the interconnectors.

12. The module as claimed in claim 1 or claim 3, the electron-conducting material and impervious to gases component of the first and/or the second interconnector being made of ferritic steel with about 20% chromium, or nickel-based.

13. An HTE electrolysis or co-electrolysis reactor, of the SOEC type comprising a stack of a plurality of modules (M1, M2) as claimed in claim 1.

14. A fuel cell of the SOFC type comprising a stack of a plurality of modules (M1, M2) as claimed in claim 3.

15. The HTE electrolysis or co-electrolysis reactor as claimed in claim 13, or the SOFC cell as claimed in claim 14, comprising mechanical means for assembly of the interconnectors together, suitable for preventing opening of the modules but not for clamping one interconnector on the other by compression.

16. The HTE electrolysis or co-electrolysis reactor as claimed in claim 13, or the SOFC cell as claimed in claim 14, comprising mechanical means for assembly comprising one or more bolts mounted passing through housings made in the interconnectors, the head of each through bolt resting in a housing of one of the end interconnectors of the stack and a nut screwed on the through bolt projecting from the other end interconnector of the stack, the head and/or the nut resting directly or indirectly on an electrical insulating sleeve mounted in at least one of the housings.

17. A method of operation of an HTE electrolysis or co-electrolysis reactor as claimed in claim 13 according to which:
   the supply lines of the first interconnector are supplied with steam or a mixture of steam and another gas selected from carbon dioxide and nitrogen dioxide and simultaneously the supply lines are supplied with equalization gas, the pressure of the steam or of the mixture supplied being roughly equal to that of the equalization gas;
   hydrogen or hydrogen and carbon monoxide or nitrogen monoxide produced by electrolysis or co-electrolysis of the steam and simultaneously the equalization gas are recovered in their respective recovery line.

18. The method of operation as claimed in claim 17, according to which the supply lines of the second interconnector are supplied with draining gas, the pressure of the draining gas supplied being roughly equal to that of the equalization gas, and the oxygen produced is recovered.

19. A method of operation of an SOFC fuel cell as claimed in claim 14 according to which:
   the supply lines of the first interconnector are supplied with fuel, and simultaneously the supply lines are supplied with the equalization gas;
   the supply lines of the second interconnector are supplied with air or oxygen, the pressure of the fuel and air or oxygen supplied being roughly equal to that of the equalization gas;
   a surplus fuel, the equalization gas, the water produced and the surplus air or oxygen, are recovered in their respective recovery line.

20. The method of operation as claimed in claim 17, according to which the temperature of the equalization gas is regulated so that the latter controls the operating temperature of the HTE electrolysis or co-electrolysis reactor.

21. The method of operation as claimed in claim 17, according to which the equalization gas is air, a neutral gas, hydrogen and/or steam.

22. The method of operation as claimed in claim 21, according to which:
   any leakages of the fuel or of the products entering or leaving the electrolysis/co-electrolysis reactor are detected by analysis of the flow rate of the mixture of equalization gas at an outlet of its recovery line, and then
   the flow rate of air as equalization gas is adjusted at an inlet of its supply line in order to burn the leaks that are detected.

* * * * *